July 12, 1938.  A. H. VON DER OHE  2,123,669
CASE CART OR TRUCK
Filed Dec. 28, 1936  2 Sheets-Sheet 2
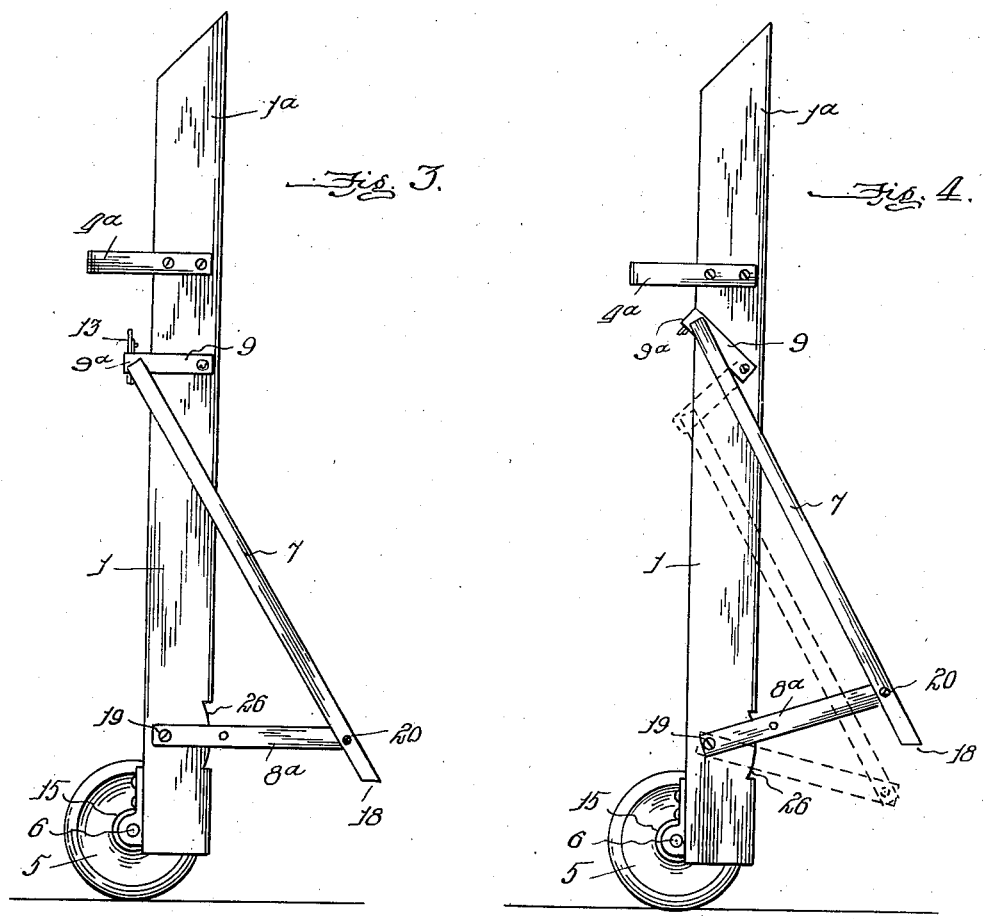
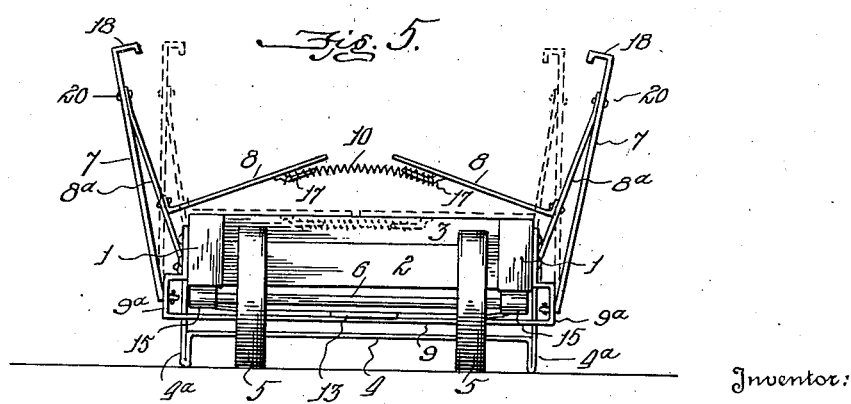
Inventor:
August H. von der Ohe.
By Horace S. Heall
Attorney.

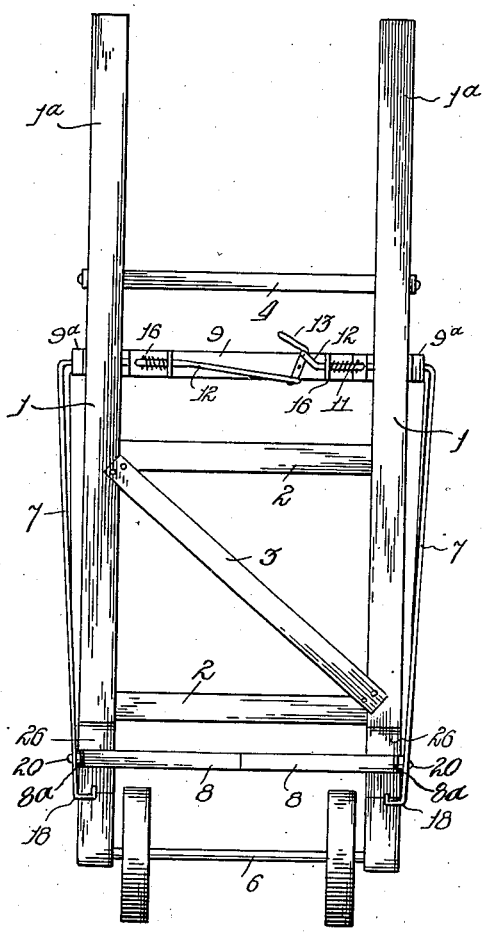

Patented July 12, 1938

2,123,669

UNITED STATES PATENT OFFICE 2,123,669

CASE CART OR TRUCK

August H. von der Ohe, La Crosse, Wis.

Application December 28, 1936, Serial No. 117,823

5 Claims. (Cl. 214—65.5)

My invention relates to manually operated wheeled trucks of that particular type adapted for transporting boxes or cases from one place to another.

The principal object of my invention is to provide a truck of this general character of special utility in moving a stack of boxes or cases containing bottled goods such as beer, milk, pop, and other beverages, whereby spaced apart gripping members or arms are brought into positive engagement with the lowest box of the stack for firmly holding the stack of boxes or cases on the frame of the truck during the moving of the same from place to place.

A further object of my invention is to provide for engagement of the gripping arms or members of the truck through the usual hand-holes or hand-holds at the opposite ends of the box or case to facilitate handling the stack of boxes in loading on to the truck and unloading therefrom.

My invention also contemplates the provision of means for adjusting the gripping arms to engage the hand-holes or hand-holds of boxes or cases of different sizes—in respect to the lowest box of the stack—in which the hand-holes or hand-holds are located at different heights from the floor according to the size of the lowermost box.

A still further object of my invention is to provide means whereby the gripping arms are caused to automatically engage the box or case in loading the truck, and automatically disengage the box or case in the operation of unloading the truck.

With these principal objects in view my invention consists in the construction of the operating parts of the truck, all as hereinafter fully described and specifically set forth in the appended claims.

In the drawings:—

Figure 1 is a front elevation of the truck, in which the gripping arms are shown in closed position.

Fig. 2 is a rear view, in which the gripping arms are sprung outwardly to receive a box or case.

Figs. 3 and 4 are side views illustrating different adjustments of the gripping arms.

Fig. 5 is a front end view of the truck in horizontal position, and

Figs. 6 and 7 are detail views of the means for adjusting the gripping arms in respect to the height of the hand holes in the box or case.

In carrying out my invention the frame or body of the truck is made up of side pieces, 1, 1, braced by crosspieces 2, 2, and a diagonal brace 3 secured at its ends to the aforementioned side pieces and crosspieces, with a metal strip 4 extending between the side pieces to form a handlebar supplementing the handles 1a, 1a, formed by extensions of the side pieces. The metal strip or handle-bar 4 also provides for supporting the rear end of the truck in horizontal position, for which purpose the ends of said strip are bent upon themselves to form projecting supports or feet 4a, 4a. These parts constitute the frame or body of the truck, supported for movement over the ground or floor by wheels 5, 5 mounted on an axle 6 extending between the side pieces of the frame and journaled at their ends in bearing boxes 15, 15.

For the purpose of gripping the sides of the stack of boxes or cases, as well as for positively engaging the lowermost box for supporting the weight of the stack in loading the truck for transportation, I provide laterally movable, forwardly projecting gripping arms 7, 7, swiveled at their upper ends to the side pieces, preferably in the projecting end portions 9a, 9a of a plate 9 extending between said side pieces, whereby the outer ends of said gripping arms are movable to and from the side pieces or to and from a box to be loaded on to the truck. These gripping arms terminate in hooks 18 adapted to engage in the hand-holes, or with the hand-holds, of a box or case, and to provide for their automatic operation in loading and unloading the truck said gripping arms are provided with connecting links 8a extending to the side pieces and carrying inwardly projecting contact members 8, with an interposed spring 10 acting to spread the arms, through the intervention of the links, so as to receive a box between the hooked ends thereof. The expansion spring is held in place between the inner ends of the contact members by means of bent rods 17, and it will be noted by reference to Fig. 5 that in the normal position of the arms the inner ends of the members 8 project outwardly, so that when they are brought against the side of a box to be loaded on to the truck they will be pressed inwardly and automatically close the arms on the ends of the box, at which time the hooks 18, 18 will pass into the usual handholes in the box (not shown). The inclination of the gripping arms from the side pieces of the frame of the truck is maintained by the links 8a, extending from the side pieces to the outer ends of the arms, being pivotally connected by screw 19 and rivet 20, the rivet being a loose connection to permit of the required movement of the arm.

From so much of the invention described it will be obvious that to load a box on to the truck it is only necessary to move the truck into position vertically (Figs. 3 and 4) when the box will be received between the projecting outer ends of the gripping arms and coming into contact with the projecting members 8, 8 the latter will operate to close the arms on the box so that the hooks 18, 18 will enter the usual hand-holes for positive engagement to support the box, or a stack of boxes, on the truck when the latter is tilted backward. The arms may be of such length, with respect to the distance of the hooks from the floor when the truck is in upright position, that said hooks will engage in the hand-holes when the arms are brought against the ends of the box by contact of the members 8 with one side thereof; but in order to provide for adjustment of the arms to accommodate boxes of different sizes, in which the hand-holes are at a greater or less height from the floor, they are swiveled in a pivoted cross plate 9, hereinbefore referred to, and said plate provided with means for locking it in adjusted position.

The adjustment of the arms, for height of the hooks from the floor, is accomplished by swinging the plate 9 to which said arms are swiveled, and to space the body of the plate from the frame of the truck the ends of said plate are bent inwardly and pivoted to the side pieces by screws 21. For locking the swinging plate in adjusted position there are spring-actuated sliding bolts 12 at opposite ends thereof, each bolt engaging a notched plate 14 secured to the adjacent side piece of the frame of the truck, and for retracting the bolts a bent lever 13 is pivoted at an intermediate position to the plate, with extensions of the bolts connected to said bent lever at opposite sides of its pivotal connection. Each bolt is supported on the plate by a hanger 16 having an outwardly projecting member through which the bolt passes, and the spring, 11, for projecting the bolt into engagement with the notched plate encircles the shank of the bolt and is interposed between the aforesaid member and a pin 11a extending through the shank. The end of the bolt which engages the notched plate is bent upon itself, as shown in Fig. 7, so that a portion thereof, as 12a, will extend into a slot 25 in the plate for guiding the bolt. As will be noted by reference to Fig. 1 the sliding bolts are connected to one member of the bent lever while the other member thereof forms a handle for operating the lever, and for this purpose said member or handle projects above the plate. There are several spaced apart notches in the plate with which the locking bolt cooperates, and by reference to Figs. 3 and 4 of the drawings it will be apparent that by this arrangement the gripping arms can be readily adjusted as to size of boxes to be handled, or height of the hand-holes from the floor, and as the contact members 8, 8 bear against the side pieces when the lowermost box of a stack is loaded on the truck said side pieces are cut away or recessed, as at 26, to insure this bearing of said contact pieces in any adjusted position of the gripping arms.

The construction and operation of my improved hand truck for moving boxes or cases will be readily understood from the foregoing description, for, as hereinbefore stated, the truck is moved vertically against a stack of boxes so that the spread gripping arms will pass beyond opposite ends of the lowermost box or case, and the contact members projecting inwardly from said arms by engaging the inner side of the box will cause the arms to automatically close on the ends thereof with the hooks entering the hand holes. Then the truck is tilted backward to transfer the load of boxes from the hooks to the body of the truck, and as the gripping arms are held against the ends of the lowermost box by pressure of the box on the contact members, in addition to the hooks engaging in the hand holes, the spring 10 is contracted so that in unloading the stack of boxes the hooks and arms will automatically disengage when the truck is moved a slight distance from the stack of boxes resting on the floor.

I claim:—

1. A hand truck for moving boxes or cases from place to place, comprising a framework or body mounted on wheels and including side pieces, arms swiveled to the side pieces and having hooks at their outer ends, links connected to the arms and to the side pieces for disposing said arms at an inclination from the side pieces, and contact members extending from the links and with which the box is adapted to engage for closing the arms on the box; together with means for adjusting the gripping arms, to accommodate boxes of different sizes, including a swinging plate to which the arms are swiveled, and means for locking the plate in an adjusted position.

2. A hand truck for moving boxes or cases from place to place, comprising a framework or body mounted on wheels and including side pieces, arms swiveled to the side pieces and having hooks at their outer ends, links connected to the arms and to the side pieces for disposing said arms at an inclination from the side pieces, and contact members extending from the links and with which the box is adapted to engage for closing the arms on the box; together with means for adjusting the gripping arms to accommodate boxes of different sizes, including a swinging plate to which the arms are swiveled, sliding bolts on the swinging plate, and a notched plate attached to the side pieces and with which the bolts engage for holding the adjustment of the plate.

3. A hand truck for moving a stack of boxes or cases from place to place, comprising a framework or body mounted on wheels and including side pieces, arms swiveled to the side pieces and having lateral movement for gripping the ends of the boxes between them, said arms having hooks at their outer ends to engage the lowermost box, links connected to the arms and to the side pieces for disposing said arms forwardly at an inclination from the body of the truck, contact members extending inwardly from the links and converging outwardly from the side pieces, in normal position, to be engaged by the lowermost box for closing the arms on the box, and means associated with the contact members and arms for effecting the normal position of the contact members and arms for spreading the latter to receive a box between them.

4. A hand truck for moving a stack of boxes or cases from place to place, comprising a framework or body mounted on wheels and including side pieces, arms swiveled to the side pieces for gripping the ends of the boxes between them and having hooks at their outer ends to engage the lowermost box, links connected to the arms and to the side pieces for disposing said arms forwardly at an inclination from the body of the truck, contact members extending inwardly from the links and converging outwardly from the side pieces to be engaged by the lowermost box for closing the arms on the box, and a spring interposed between the contact members for spreading the arms to receive a box between them.

5. A hand truck for moving a stack of boxes or cases from place to place, comprising a framework or body mounted on wheels and including side pieces, arms swiveled to the side pieces for gripping the ends of the boxes between them and having hooks at their outer ends to engage the lowermost box, links connected to the arms and to the side pieces for disposing said arms forwardly at an inclination from the body of the truck, contact members extending inwardly from the links and converging outwardly from the side pieces to be engaged by the lowermost box for closing the arms on the box, and a spring interposed between the contact members for spreading the arms to receive a box between them; together with means for adjusting the swivel connection of the arms on the side pieces for adjusting the arms to accommodate boxes or cases of different sizes.

AUGUST H. von der OHE.